(12) United States Patent
Poggi et al.

(10) Patent No.: US 9,667,568 B2
(45) Date of Patent: May 30, 2017

(54) METHOD FOR AUTOMATICALLY DETECTING PHYSICAL CONNECTIONS OF ETHERNET BRIDGES CONNECTED TO A ROOT BRIDGE

(71) Applicant: Telefonaktiebolaget L M Ericsson (publ), Stockholm (SE)

(72) Inventors: Fabio Poggi, Genoa (IT); Roberto Gallino, Alessandria (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 178 days.

(21) Appl. No.: 14/649,157

(22) PCT Filed: Dec. 10, 2012

(86) PCT No.: PCT/EP2012/074974
§ 371 (c)(1),
(2) Date: Jun. 2, 2015

(87) PCT Pub. No.: WO2014/090280
PCT Pub. Date: Jun. 19, 2014

(65) Prior Publication Data
US 2015/0304247 A1    Oct. 22, 2015

(51) Int. Cl.
*H04L 12/46* (2006.01)
*H04L 12/937* (2013.01)
*H04L 12/721* (2013.01)

(52) U.S. Cl.
CPC ............ *H04L 49/254* (2013.01); *H04L 45/26* (2013.01); *H04L 45/44* (2013.01); *H04L 45/66* (2013.01); *Y02B 60/43* (2013.01); *Y02B 60/44* (2013.01)

(58) Field of Classification Search
None
See application file for complete search history.

(56) References Cited

U.S. PATENT DOCUMENTS 7,379,429 B1     5/2008   Thottakkara
8,380,828 B1 *   2/2013   Schlichter ........... H04L 63/0227
                                                        709/221

(Continued)

OTHER PUBLICATIONS

PCT International Search Report, mailed Mar. 28, 2013, in connection with International Application No. PCT/EP2012/074974, all pages.

(Continued)

*Primary Examiner* — Michael J Moore, Jr.
*Assistant Examiner* — Duc Duong
(74) *Attorney, Agent, or Firm* — Leffler Intellectual Property Law, PLLC (57) ABSTRACT

A method of detecting physical connections between a root bridge node and layer-2 bridge nodes organised in a layer-2 cloud. The method comprises sending a query message from a sending port of the root bridge node and starting a timer set to a waiting interval. After the timer expired, if a response message to the query message is not received or is received at the sending port then only the sending port is associated with said layer-2 cloud. Alternatively, if a response message is received at a port other than the sending port then the sending port and the receiving port are associated with said layer-2 cloud. A bridge node and a layer-2 communications network are also disclosed.

20 Claims, 7 Drawing Sheets

(56) References Cited

U.S. PATENT DOCUMENTS

| | | | |
|---|---|---|---|
| 2001/0021177 A1 | 9/2001 | Ishii | |
| 2005/0036510 A1* | 2/2005 | Sarikaya | H04W 68/08 370/469 |
| 2008/0310421 A1* | 12/2008 | Teisberg | H04L 12/4641 370/395.53 |
| 2011/0044346 A1* | 2/2011 | Mueller | H04L 1/0003 370/401 |
| 2011/0268118 A1* | 11/2011 | Schlansker | H04L 12/4641 370/392 |
| 2013/0170490 A1* | 7/2013 | Kreeger | H04L 41/12 370/390 |
| 2013/0242757 A1* | 9/2013 | Tsai | H04L 12/462 370/244 |
| 2013/0250810 A1* | 9/2013 | Ho | H04L 41/12 370/255 |
| 2014/0064150 A1* | 3/2014 | Finn | H04L 45/48 370/256 |

OTHER PUBLICATIONS

IEEE Standard 802.1D "Media Access Control (MAC) Bridges" Jun. 9, 2004, IEEE, New York, NY, US, pp. 1-281.

IEEE Standard 802.1AB "Station and Media Access Control Connectivity Discovery" Sep. 17, 2009, IEEE, New York, NY, US, pp. 1-204.

IEEE Standard 802.1Q "Virtual Bridged Local Area Networks" May 19, 2006, IEEE, New York, NY, US, pp. 1-303.

\* cited by examiner

METHOD FOR AUTOMATICALLY DETECTING PHYSICAL CONNECTIONS OF ETHERNET BRIDGES CONNECTED TO A ROOT BRIDGE

TECHNICAL FIELD

The present invention relates to layer-2 communications networks, in general, and in particular to detecting physical connections in layer-2 networks organised in groups known as layer-2 clouds.

BACKGROUND

Figure 1:
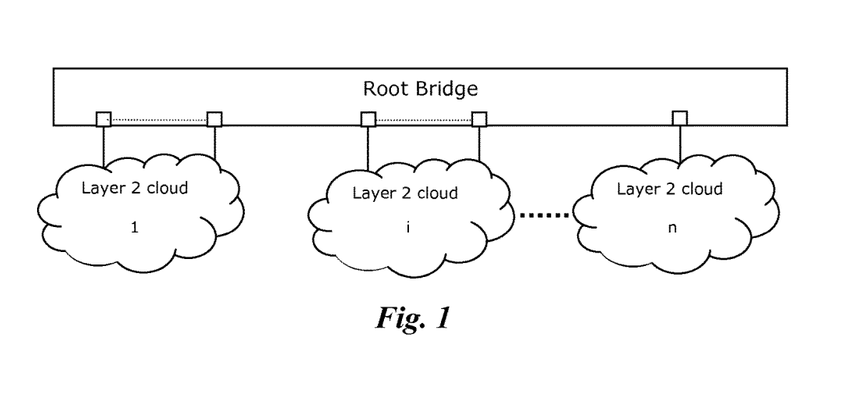
FIG. 1 is a diagram illustrating a layer-2 communications network in one embodiment of the present invention.

An Ethernet network is typically defined on layer 2 in the Open Systems Interconnection model (OSI) provided by International Organization for Standardization (ISO). Layer 2 is also commonly referred to as the Data Link Layer in the OSI-model. An Ethernet network may typically comprise a large number of layer 2 switch or bridge devices, hereinafter referred to as bridge nodes. These bridge nodes may be interconnected and grouped in a large number of different ways in order to form different sub-networks or groups of bridge nodes. These groups of bridge nodes may commonly be referred to as layer 2 cloud networks or Ethernet networks, that is, networks of Layer 2 network devices (such as, switches or bridges) which are connected together via a ring or a meshed network. These groups of bridge nodes may also be connected to each other through a single common bridge node, which is commonly referred to as a root bridge node as illustrated in FIG. 1. The root bridge node may be a bridge node that is configured to act as a root bridge node. The root bridge node may be elected by a network protocol called Spanning Tree Protocol (STP) or be manually configured to act as the root bridge node.

STP is a network protocol that ensures a loop-free topology for an Ethernet network. STP may be employed to prevent loops in the groups of bridge nodes and the broadcast messaging resulting from such loops. STP is also standardized in the IEEE 802.1D standard. Hereinafter, xSTP is used to denote the different variations of STP that may be employed for the groups of bridge nodes, such as, for example, Rapid Spanning Tree Protocol (RSTP), Multiple Spanning Tree Protocol (MSTP) or any other variation of STP.

When implemented in a group of bridge nodes, xSTP creates a spanning tree within the meshed or ringed network of bridge nodes, and disables those links that are not part of the spanning tree, leaving a single active path between any two bridge nodes.

Ethernet switches residing in one of these layer-2 clouds can be variously connected to each other, letting to the RSTP protocol the task to remove any loop between them.

Although a number of layer-2 clouds (e.g. Ethernet networks) may be connected to the same root bridge node these layer-2 clouds have no relationship with each other. The root bridge node, in turn, does not know details of the number, the consistency and the connectivity of the layer-2 clouds connected to it. In known solutions information about layer-2 clouds (consistency, connectivity, etc) has to be manually entered in the root bridge node and it is assumed to be static. This means that the view of Ethernet network form the root bridge node must be statically configured by the operator, which, in turn, means that the operator has to associate each port of root bridge node to a specific layer-2 cloud, subjected to possible errors.

SUMMARY

It is the object of the present invention to obviate at least some of the above disadvantages and provide an improved method and device to automatically detect physical connections of layer-2 bridges connected to the root bridge node.

According to a first aspect of the present invention there is provided a method of detecting physical connections between a root bridge node and layer-2 bridge nodes, the layer-2 bridge nodes being organised in a layer-2 cloud. The method comprises steps of sending a query message from a sending port of the root bridge node and starting a timer set to a waiting interval. After the timer expired the method comprises associating a port of the root bridge node with a layer-2 cloud. The association depends on if and on which port a response message to said query is received. If the response message is not received or is received only at the sending port then only the sending port is associated with said layer-2 cloud. If the response message is received at a port other than the sending port then the sending port and the receiving port are associated with said layer-2 cloud.

According to a second aspect of the present invention there is provided a bridge node adapted to operate as a root bridge node in a layer-2 communications network. The bridge node comprises a plurality of ports for connecting layer-2 clouds, wherein a layer-2 cloud being a network comprising a plurality of layer-2 bridges. The bridge node further comprises a transmitter adapted to send a query message from a sending port, a receiver adapted to receive a response message from a port, a processor and a timer. The processor is adapted to set the timer to a waiting interval after a query message had been sent from the sending port.

The processor is further adapted to associate a port of the root bridge node with a layer-2 cloud after said timer expires, wherein the association depends on if and on which port a response message to said query is received. If a response message to the query message is not received or is received only at the sending port then only the sending port is associated with said layer-2 cloud. If a response message is received at a port other than the sending port then the sending port and the receiving port are associated with said layer-2 cloud.

According to a third aspect of the present invention there is provided a layer-2 communications network comprising a bridge node as defined above.

Further features of the present invention are as claimed in the dependent claims.

The present invention provides the benefit of automated configuration of a root bridge nodes, which in turn prevents possible configuration errors caused manual configuration. Additionally, the present solution allows for a quick reaction and configuration update in case of change in topology of the layer-2 clouds connected to the root bridge node. The present invention allows avoiding possible manual misconfiguration that could happen in the prior solutions where the root bridge node has to be manually configured with a static association between their ports and the subtended layer 2 clouds.

BRIEF DESCRIPTION OF THE DRAWINGS

The present invention will be understood and appreciated more fully from the following detailed description taken in conjunction with the drawings in which.

DETAILED DESCRIPTION

The mechanism described in embodiments of this invention is based on a protocol having the main goal to automatically detect physical connections of layer-2 bridges connected to a root bridge node. This protocol is implemented in the root bridge node and in the layer-2 bridge nodes in the layer 2 cloud(s). This protocol does not follow the port role status created by RSTP protocol in layer-2 cloud, but is propagated on ports of layer-2 bridge nodes, travelling across either Discarding, Learning or Forwarding port states. Discarding port state prevents the forwarding of data frames. Learning port state accepts data frames to populate the MAC address table, but without forwarding. Forwarding port state forwards data frames, assuring the learning phase as well.

To implement the method in one embodiment of the present invention a root bridge node should be already elected, or the configuration of the network must be such that a node that will assume the role of the root bridge is well known. In embodiments of the present invention a root bridge node is a layer-2 bridge node that has been elected or otherwise configured to perform the role of a root. Procedures for election and/or configuration as a root are well known in the art (described e.g. in IEEE 802.1D) and will not be discussed in this document.

Figure 2:
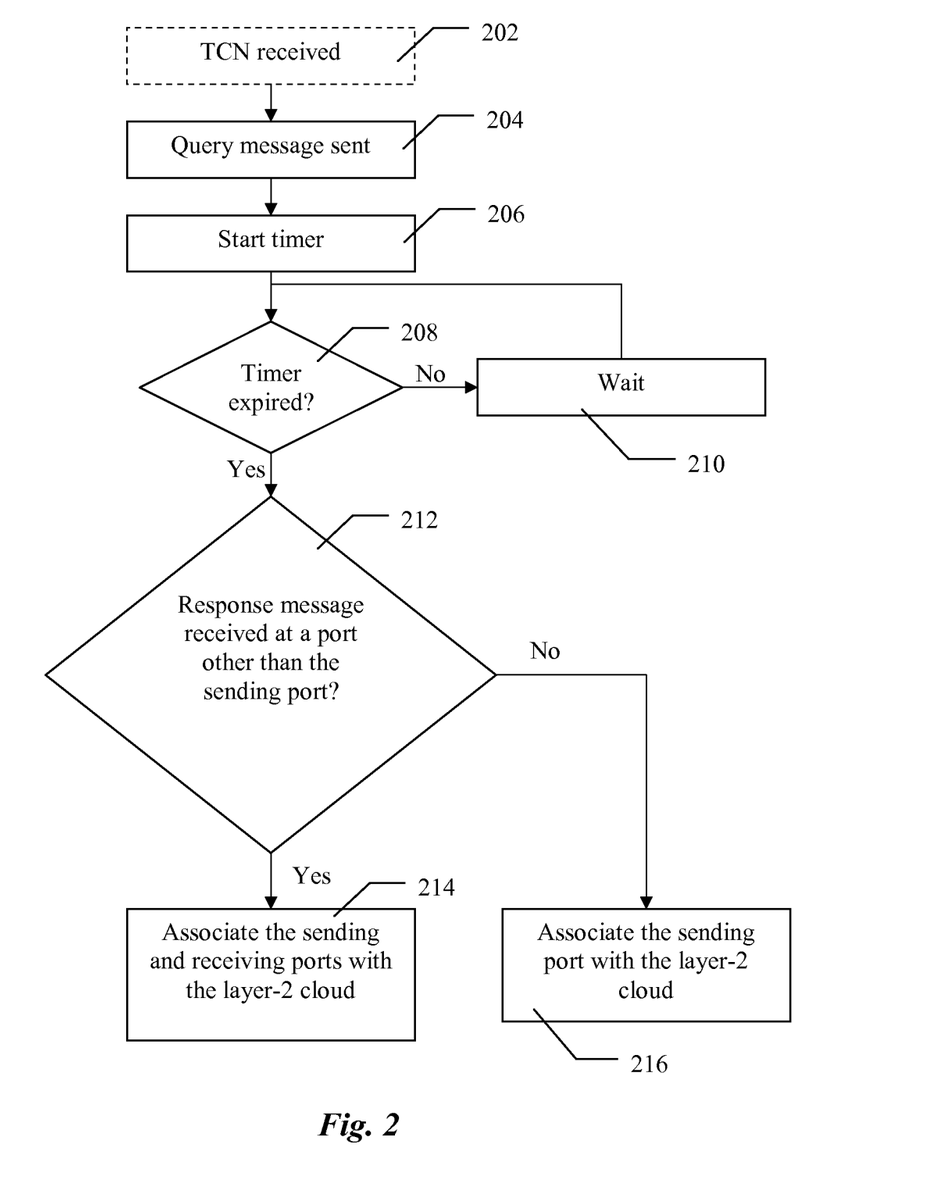
FIGS. 2 and 3 are diagrams illustrating a method of detecting physical connections between a root bridge node and layer-2 bridge nodes organised in a layer-2 cloud in one embodiment of the present invention.
Figure 3:
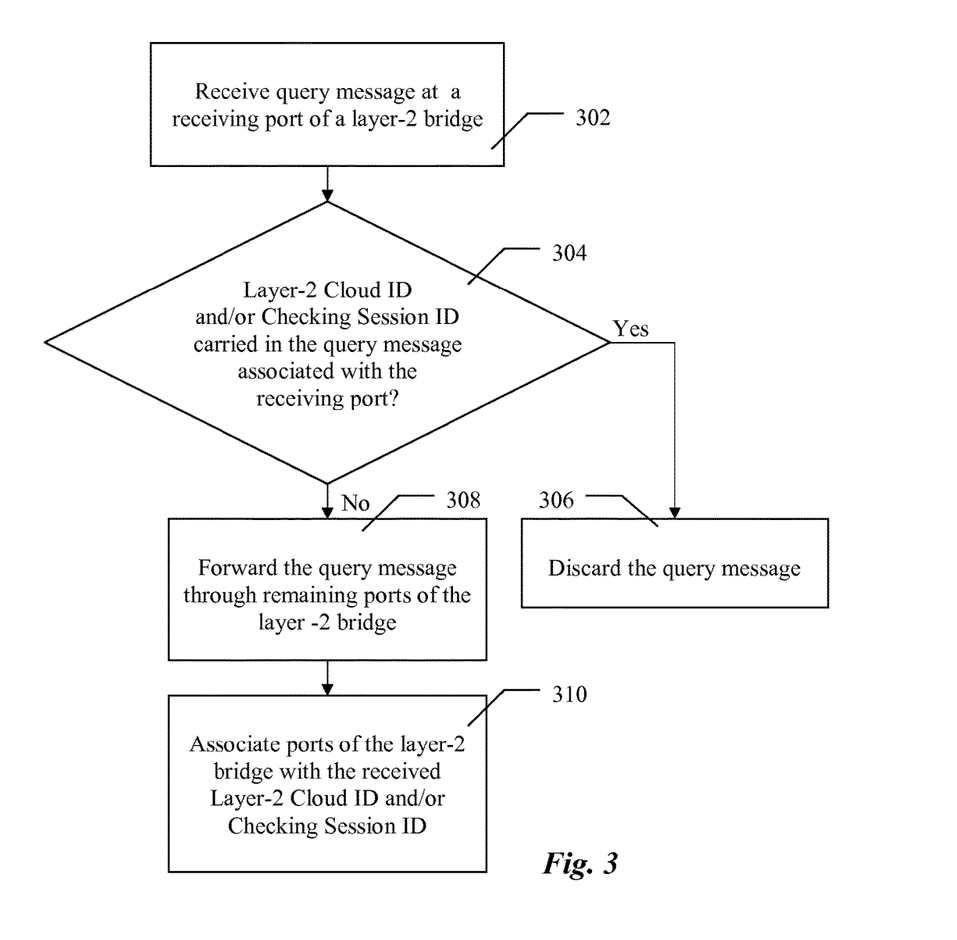
Figure 4:
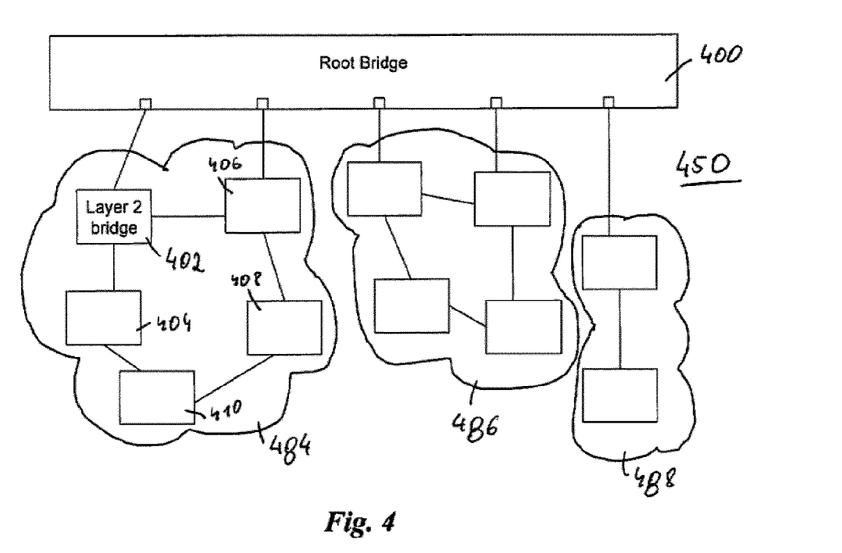
FIGS. 4-9 are diagrams illustrating operation of a layer-2 communication according to an embodiment of a method of detecting physical connections between a root bridge node and layer-2 bridge nodes organised in a layer-2 cloud.

With reference to FIG. 2 and FIG. 4 an embodiment of the method of detecting physical connections between a root bridge node 400 and layer-2 bridge nodes 402-410 organised in a layer-2 cloud 484 is described below. Two more layer-2 clouds, 486 and 488 are shown in FIG. 4. The method starts with sending 204 a query message from a sending port of the root bridge node and starting 206 a timer. The timer is set to a waiting interval in which a response is supposed to be received by one or more ports of the root bridge node. A processor implementing the method in the root bridge node waits, 208, 210, until the timer expires. Once the timer expired 208 the method comprises associating 214, 216 one or more ports of the root bridge node with a layer-2 cloud.

Only one port is associated, 216, with the layer-2 cloud if no response message has been received or if the response message is received at the sending port, 212.

More than one port is associated with the layer-2 cloud if the response message is received at a port (or ports) other than the sending port, 212. In this situation the sending and the receiving ports are associated 214 with the layer-2 cloud.

The root bridge node has a plurality of ports and in order to have a full picture of all layer-2 clouds connected to the root bridge node it must be determined to which layer-2 cloud which port is connected. In a preferred embodiment the root bridge node sends a query message from its first port and once the method is completed for this first port the root bridge node repeats the step for its next unassigned port and so on. Unassigned, as used above, means that the port is not associated with (assigned to) any Layer-2 cloud. Deciding which port of a root bridge node is the first one is not the subject matter of this invention and can be done in many various ways. In an alternative embodiment query messages are sent from all ports without waiting for a response message. Sending messages from all ports at the same time can provide the same result, but this implementation has to correlate the received answers in case more than one port belongs to the same layer-2 cloud and has to resolve possible inconsistency. Performing the method for individual ports is more effective than sending query messages from all ports at the same time (or at least without waiting for completing the method for one port before sending another query message) because there may be clouds (e.g. clouds 484 and 486) that are connected to the bridge node 400 via more than one port. In these situations sending a query message from one port results in assigning more than one port to one layer-2 cloud and this assigned receiving port does not have to be investigated further. Therefore, it is preferred to send the query messages sequentially from the ports and wait for the timer expiration.

Figure 7:
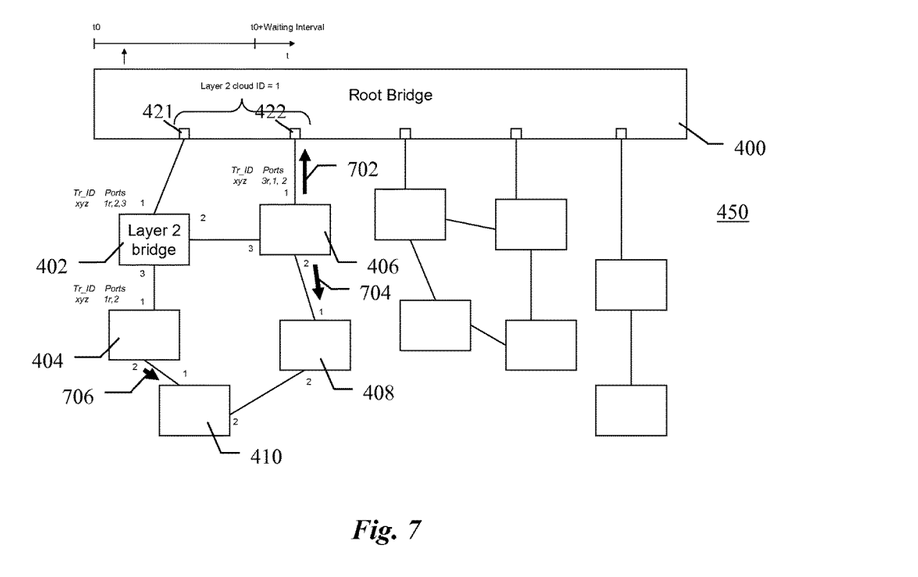

In the example illustrated in FIG. 7 when a response to a query message sent from port 421 is received, arrow 702, at port 422 both ports are associated with the same layer-2 cloud and there is no need to send a query message from the port 422.

On the other hand, sending query messages from all ports may result in associating the same layer-2 cloud with the same ports multiple times and would require additional processing in order to eliminate these multiple associations of the same cloud.

Layer-2 cloud ID is an identification of a layer-2 cloud defined autonomously by the root bridge node.

Figure 10:
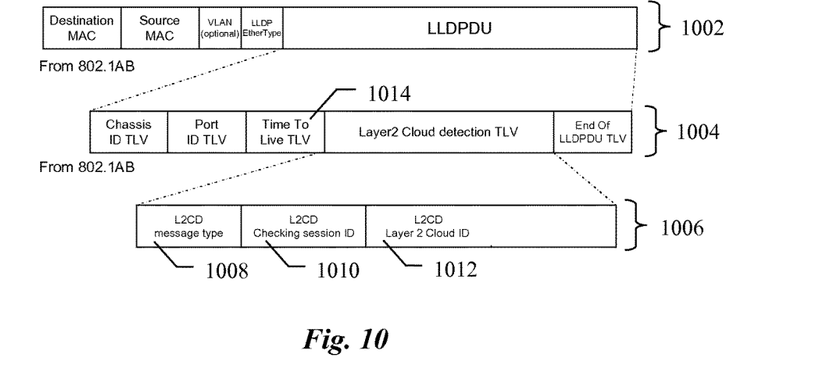
FIG. 10 is a diagram illustrating encapsulation of Layer-2 Cloud Detection query message protocol into Link Layer Discovery Protocol Data Unit, LLDPDU, frame in one embodiment of the present invention.

In a preferred embodiment the root bridge node 400 creates a query message (also known as Layer-2 Cloud detection query message) having at least one of the following:

- a unique Checking Session ID value, 1010, that has the goal of uniquely identifying the checking session originated by the Root Bridge and/or
- a unique Layer 2 Cloud ID value, 1012, associated with the port from which the root bridge node starts the Checking Session ID.

In one embodiment, in which only the Checking Session ID is used in the message, the layer-2 bridges do not know the Cloud ID assigned by the root bridge. It is enough if the root bridge node keeps the association between Checking Session ID and the Cloud ID. From a protocol perspective, the Cloud ID value makes sense for root bridge only, while the Checking Session ID value is used by Root Bridge and the layer-2 bridges in order to decide whether to forward the query message or not. If no Cloud ID value is carried inside query message, this forces the Checking Session ID to be always different among every discovery sessions originated by the root bridge.

It is also possible to use only Cloud ID value in the query message. In this embodiment the layer-2 bridges would not be able to distinguish between messages from different sessions and would discard messages if the same cloud ID has already been received to prevent loops. This will work as long as associations between the Cloud ID and the ports on layer-2 bridges have a defined time-to-live parameter. The time-to-live parameter for the association between the Cloud ID and the ports on layer-2 bridges is set based on a value Time-To-Live TLV (type-length-value), 1014, carried in the LLDPDU message, 1004.

It has to be understood, however, that using only Cloud ID in the query message in order to decide whether to forward or not the query message can be problematic. This is because, after a first period in which all local layer-2 bridge ports are associated with that Cloud ID, the query message will not be more forwarded until the next time-to-live interval is expired. This means that query messages with this Cloud ID value sent during time-to-live interval would be wasted.

Therefore, in a preferred embodiment Checking Session ID, 1010, and Layer 2 Cloud ID, 1012, values are used in the query messages 1006. The advantage of using both ID values is that Cloud ID and Checking Session ID values allow the protocol to vary Checking Session ID independently among various Cloud IDs. Additionally, the use of Cloud ID inside the query message, allows the operator to understand what cloud the layer-2 bridge belong to with a simple SNMP GET.

In one embodiment the query messages 1006 also comprises L2CD Message Type field, 1008, which defines the type of message sent. Initially only Query type message is required. In the future, other message types can be created in order to regulate further specific communication between root bridge node and bridge node.

In a preferred embodiment the root bridge node, 400, sends several (i.e. more than one) query messages from the same port, in order to assure that a loss of a single message does not affect the layer-2 cloud detection mechanism. In one embodiment the query message is addressed to a Destination MAC Address belonging to Reserved Group MAC Address pool.

When query messages are sent multiple times they are, preferably, sent periodically with a Query Interval in order to determine or verify the current physical connections in a layer-2 cloud. This embodiment also requires a Waiting Interval in which a response is supposed to be received by one or more of ports of the root bridge (different from the port the query message was sent from) in order to associate the sending port and all ports that received the response to the same layer-2 cloud. In a preferred embodiment the Waiting Interval should be greater than the Query Interval and the Query Interval should be equal or greater then number of ports*Waiting Interval.

In a preferred embodiment the Query Interval is longer than the Waiting Interval because if the root bridge node 400 receives a response it means that the query had not been lost and then there is no need to send another query. If the root bridge node 400 does not receive a response it may be that the sending port is the only one port attached to this particular layer-2 cloud or it may be that the query was lost en route. In this situation repeating sending of the query message can clarify this.

Also in a preferred embodiment the Query Interval is long enough to allow the root bridge node 400 to investigate all its ports according to the configured Waiting Interval for each port, in order to limit the amount of control traffic (i.e. the number of query messages sent). This means that preferably the Query Interval is equal or greater than number of ports*Waiting Interval as explained above.

Also preferably, the Query Interval and the Waiting Interval are configurable in a network management system.

In a preferred embodiment the response message received by the root bridge node, 400, is the same as the query message that was sent by said root bridge node, 400. This limits processing performed by the layer-2 bridges that receive and forward the query message. It is, however, possible that the response message is different from the query message.

In a preferred embodiment the protocol 1002 defined in IEEE 802.1AB standard, extended to the needs of this invention is used to carry the query message. The LLDPDU 1004 message defined in 802.1AB is adopted for all mandatory components defined in the standard like: Chassis ID, Port ID and Time-To-Live TLV, 1014. After all protocol specific TLV, the final mandatory End-Of-LLDPDU TLV will be inserted. Each LLDPDU message 1004 is addressed to the "Nearest Customer Bridge" reserved MAC address defined in 802.1AB. Each LLDPDU message can be encapsulated in a specific and configurable VLAN. The LLDPDU is adapted to create the query message 1006 in as shown in FIG. 10. This adaptation is obtained via "Organizationally Specific TLVs" foreseen by the 802.1AB.

In the following tables the proposed protocol's details are defined:

TABLE 1

Basic format for Organizationally Specific TLV

| TLV type | TLV information string length | Organizationally Unique Identifier (OUI) | Organizationally Defined Subtype | Organizationally Defined Information String |
|---|---|---|---|---|
| 127 | Calculated | Value from IANA | L2CD protocol ID (e.g. 01) | TLV-type L2CD specific: message type Checking session ID Layer 2 Cloud ID |

The L2CD TLV (Layer-2 Cloud Detection TLV) format is as follow:
Type=1 byte; states the L2CD TLV component.
Length=1 byte; states the TLV Value length in bytes.
Value=variable length; contains the specific type information.

TABLE 2

L2CD TLV definition

| | Type [decimal] | Length [Byte] | Value |
|---|---|---|---|
| Message Type | 01 | 01 | [1 byte field] - 01 = Query |
| Checking Session ID | 02 | 02 | [2 bytes field] - Variable value decided by the application |
| Layer 2 Cloud ID | 03 | 01 | [1 byte field] - Variable value decided by the application |

Figure 5:
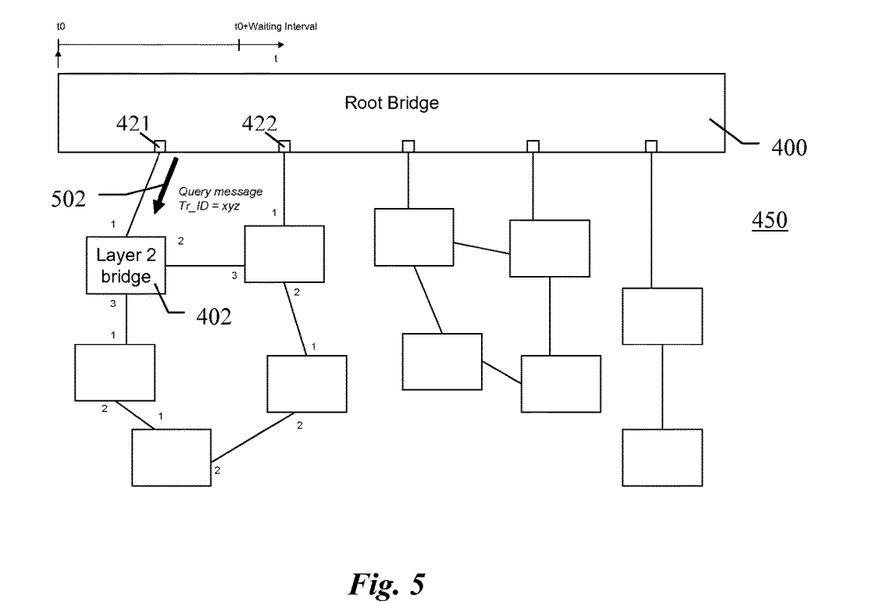

With reference to FIGS. 2, 3 and 5 to 9 the method according to embodiments of the present invention will be described in more details below. After sending 204 a query message 502, the root bridge node 400 arms a timer 206 to a defined Waiting Interval in which it waits a response from one of its ports. In a preferred embodiment this timer is configurable. The query message 502, as shown in FIG. 5, is received at port 1 of a layer-2 bridge 402.

Figure 6:
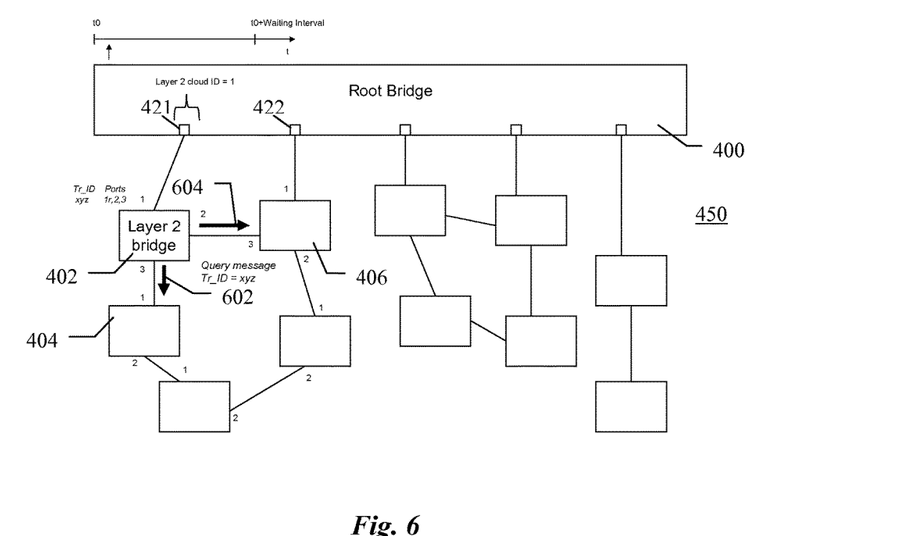

The root bridge node 400 associates the Layer-2 Cloud ID sent in the query message 502 with its port 421 as shown in FIG. 6.

Handling of the query message after it has been sent from the root bridge node will now be described with reference to FIG. 3 and FIGS. 6-9.

FIG. 6 shows the layer-2 bridge, 402, located inside the layer-2 cloud that after receiving, 302, the query message at its port 1, checks if the Checking Session ID and/or Layer-2 Cloud ID values carried in the query message are already associated with the receiving port, 304. If not, then the layer-2 bridge 402 forwards, 308, this message through its ports 2 and 3 (arrows 602 and 604), but not through port 1 where the message was received. The query message is forwarded to layer-2 bridges 404 and 406. The layer-2 bridge associates, 310, each egress port (i.e. ports 2 and 3) with this Checking Session ID value and/or Layer-2 Cloud ID value. The association remains valid until the layer-2 bridge 402 receives a new Checking Session ID or until the time-to-live parameter (associated to Time-To-Live TLV value), 1004 expires.

FIG. 7 shows a layer-2 bridge 406 forwarding further the query message from its ports 1 and 2, arrows 702 and 704. port 2 of the layer-2 bridge 406 sends, 704, the query message to port 1 of a layer-2 bridge 408 whereas port 1 of the layer-2 bridge 406 forwards, 702, the query message to the root bridge node 400. The same operations of associating the received Layer 2 Cloud ID and/or Checking Session ID with the ports of the layer-2 bridge 406 are performed as discussed earlier.

In similar fashion the layer-2 bridge 404 forwards, 706, the query message to layer-2 bridge 410. This process continues on each Bridge in the Layer 2 Cloud.

When the root bridge node 400 receives the query message back from another port (or ports), 422, different from the sending one 421, it associates the port from which the message has been sent, 421, and all the ports where the message has been received, 422, as belonging to the same Layer-2 Cloud ID. When no query message is received within the Waiting Interval, only the sending port is associated with the Layer-2 Cloud ID.

Figure 8:
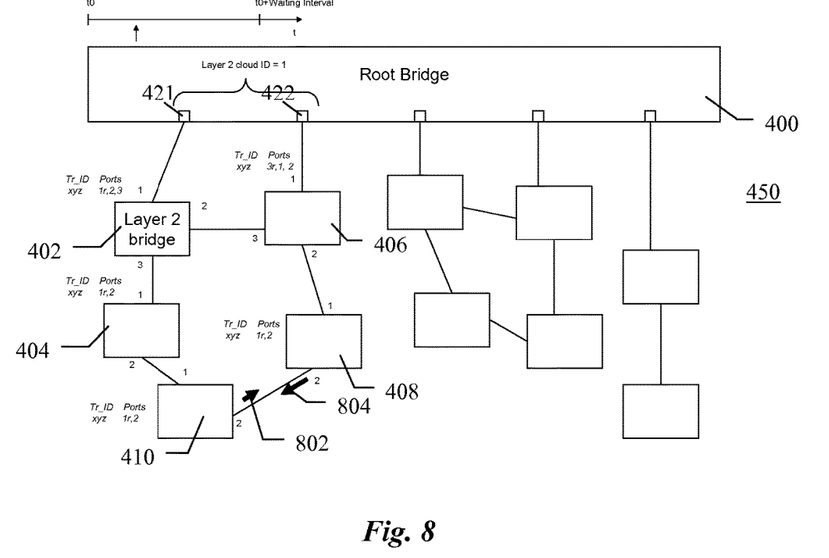

When a layer-2 bridge located inside the layer-2 cloud receives, 302, a query message with a Checking Session ID and/or Layer-2 Cloud ID already associated, 304, with the receiving port, it discards, 306, this query message avoiding any possible endless loop. This is illustrated in FIG. 8 where two copies, 802, 804, of the same query message are sent in opposite directions between layer-2 bridges 408 and 410.

Figure 9:
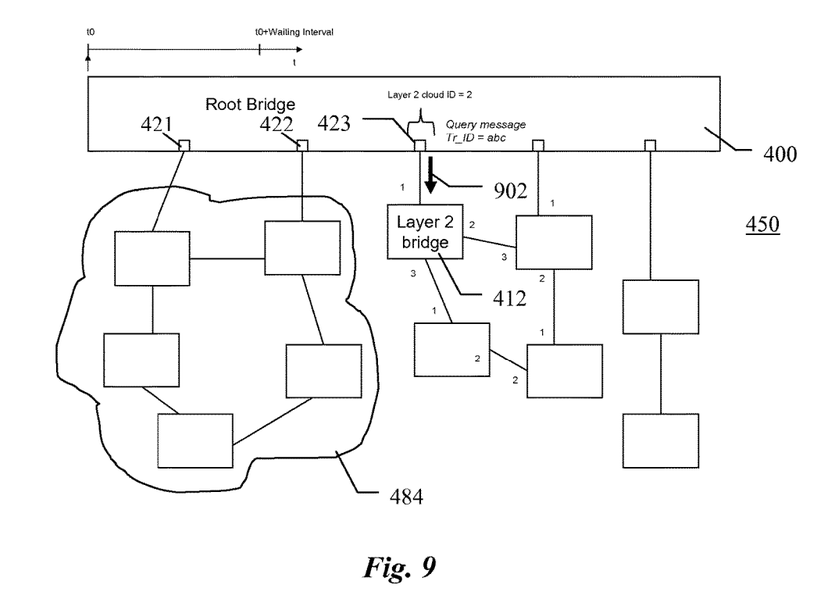

After expiration of the Waiting Interval for a first Layer 2 Cloud ID and the consequent association between Layer 2 Cloud ID of the layer-2 cloud 484 and ports 421 and 422, the root bridge node 400 selects the next available port 423 (the first not associated port from its port list) and selects a new Layer-2 Cloud ID. Then it starts a new Checking Session by sending a query message, arrow 902, with the new Checking Session ID and/or new Layer-2 Cloud ID to layer-2 bridge 412 and waits for another Waiting Interval as illustrated in FIG. 9.

This process goes on until all the ports in the list, have been verified.

In a preferred embodiment the association between the at least one of the Layer-2 Cloud ID or Checking Session ID values and the ports of the layer-2 bridge 402-410 has a defined time-to-live value, which means it will not last for ever. Introducing the time-to-live value have the advantageous effects that the table (or any other data structure) storing these associations in the layer-2 bridge will not grow too big because after the TTL expires the corresponding entry is removed from the table. Additionally if the query message contains only the Layer-2 Cloud ID keeping the associations would result in new query messages being discarded, but removing these associations periodically allows for refreshing and updating the associations between layer-2 clouds and the ports of the root bridge node 400.

When a topology change notification (TCN) is received 202 by the root bridge node 400 from a port the layer-2 cloud information is kept valid, but a new checking session process is started without waiting for the next scheduled checking session time (i.e. without waiting for expiration of the current Query Interval). This reception of TCN 202 is depicted with a dashed line in FIG. 2 to illustrate it as an alternative initiation of the method, the other alternative being the periodic sending of the query messages with a Query Interval.

Figure 11:
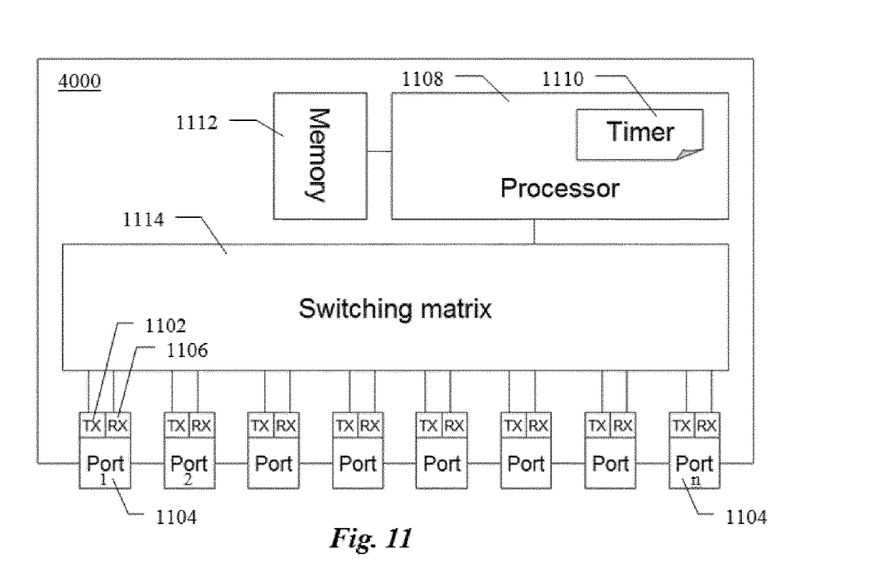
FIGS. 11 and 12 illustrate root bridge node in embodiments of the present invention.

A bridge node, 4000, in one possible embodiment of the present invention is illustrated in FIG. 11. The bridge node, 4000, is adapted to operate as a root bridge node 400 in an Ethernet network 450. In alternative embodiments the network 450 can be Token Ring, Wireless LAN network. A person skilled in the art would also characterise this network as a layer-2 communications network reflecting the OSI (Open Systems Interconnection) level at which the protocols work. The bridge node 4000 comprises a plurality of n ports 1104 for connecting a network comprising a plurality of layer-2 bridges. The networks of layer-2 bridges are commonly known as layer-2 clouds. The ports 1104 have comprises transmitters 1102 which transmit a query message from their associated ports 1104. The bridge node, 4000, further comprises receivers 1106 associated with the ports 1104. A receiver receives a response message from a port 1104. The bridge node, 4000, also comprises a switching matrix (a switch) 1114 located between a processor 1108 and the transmitters/receivers 1102/1106. A query message is originated by the processor 1108 and is directly allocated to one of the ports. The processor 1108 can send a query message through any of the ports 1104 by sending said query message to the switching matrix 1114, which directs the query message to appropriate port 1104 based on information from the processor 1108. In a preferred embodiment the processor 1108 comprises a timer 1110, wherein the processor 1108 is adapted to set the timer 1110 to a waiting interval after a query message had been sent from a port 1104. The processor 1108 is adapted to associate the port 1104 with a layer-2 cloud after said timer 1110 expires. The bridge node, 4000, further comprises a memory 1112 for storing the associations and other information necessary for the processor 1108 to operate. As discussed earlier, with regards to the embodiments of the method of the invention if a response message to the query message is not received or is received at the sending port then only the sending port is associated with said layer-2 cloud. However, if a response message is received at a port different than the sending port then the sending port and the receiving port are associated with said layer-2 cloud.

Figure 12:
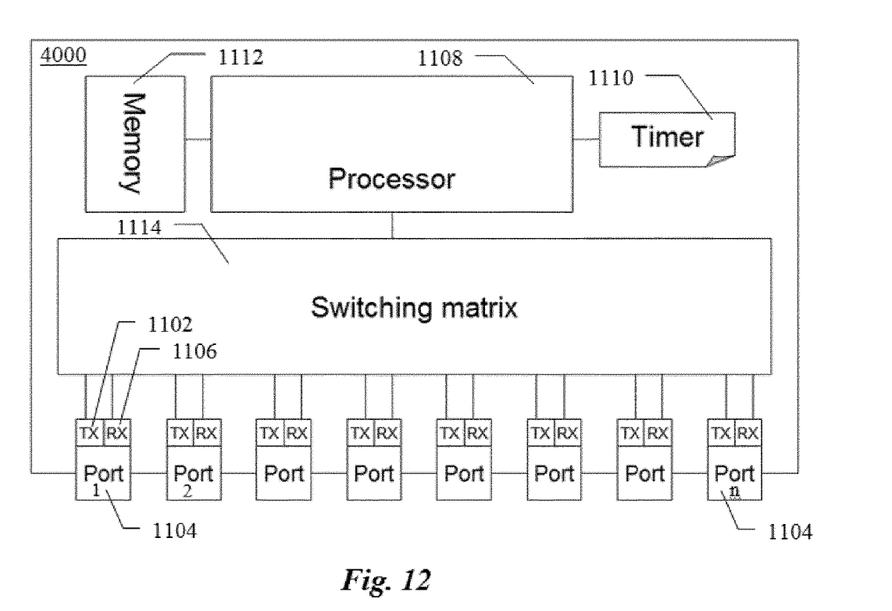

In one embodiment the timer 1110 is implemented as a software module in the processor 1108, as illustrated in FIG. 11. In an alternative embodiment, illustrated in FIG. 12, the timer 1110 is implemented as a separate hardware module.

The bridge node 4000 is adapted to operate as a root bridge node in a layer-2 communications network 450 as described in embodiments of the method of the present invention.

Finally, the present invention can also be implemented as a layer-2 communications network 450 comprising a bridge node 4000 operating as a root bridge node 400 in accordance with embodiments of the method described earlier.

The invention claimed is:

1. A method of detecting physical connections between a root bridge node and layer-2 bridge nodes, the layer-2 bridge nodes being organised in a layer-2 cloud, the method comprising:
    sending a query message from a sending port of the root bridge node;
    starting a timer set to a waiting interval;
    after the timer expired, associating a port of the root bridge node with a layer-2 cloud, wherein
        if a response message to the query message is not received or is received only at the sending port then only the sending port is associated with said layer-2 cloud; and
        if a response message is received at a port other than the sending port then the sending port and the receiving port are associated with said layer-2 cloud.

2. The method according to claim 1, wherein the query message comprises a Layer-2 Cloud ID value.

3. The method according to claim 2 comprising repeating the steps by sending a query message from an unassigned port, wherein the query message comprises a different Layer-2 Cloud ID value.

4. The method according to claim 2, wherein a layer-2 bridge in a layer-2 cloud, after receiving the query message at a first port, forwards said query message from remaining ports and associates at least one of the Layer-2 Cloud ID or Checking Session ID values with the first port and the remaining ports.

5. The method according to claim 1 wherein the query message comprises a Checking Session ID value.

6. The method according to claim 1, wherein the query message comprises a value determining validity interval represented by Time-To-Live (TLV) of the query message.

7. The method according to claim 1, comprising sending a plurality of query messages from the same port.

8. The method according to claim 7, wherein the messages are sent periodically with a query interval.

9. The method according to claim 8, wherein the query interval is N times greater than the waiting interval, where N is the number of ports in the root bridge node.

10. The method according to claim 8, wherein at least one of the query interval or the waiting interval is configurable in a network management system.

11. The method according to claim 1, wherein the response message is the same as the query message.

12. The method according to claim 1, wherein the method is initiated by reception of a Topology Change Notification on any port of the root bridge node.

13. A bridge node adapted to operate as a root bridge node in a layer-2 communications network, the bridge node comprising a plurality of ports for connecting layer-2 clouds, a layer-2 cloud being a network comprising a plurality of layer-2 bridges, wherein the bridge node further comprises:
    a transmitter adapted to send a query message from a sending port;
    a receiver adapted to receive a response message from a port;
    a processor; and
    a timer, wherein the processor is adapted to set the timer to a waiting interval after a query message had been sent from the sending port;
    the processor is further adapted to associate a port of the root bridge node with a layer-2 cloud after said timer expires, wherein
        if a response message to the query message is not received or is received only at the sending port then only the sending port is associated with said layer-2 cloud; and
        if a response message is received at a port other than the sending port then the sending port and the receiving port are associated with said layer-2 cloud.

14. The bridge node according to claim 13, wherein the query message comprises a Layer-2 Cloud ID value.

15. The bridge node according to claim 13, wherein the query message comprises a Checking Session ID value.

16. The bridge node according to claim 13, wherein the query message comprises a value determining validity interval of the query message.

17. The bridge node according to claim 13, wherein the query message is encapsulated in a payload of a Link Layer Discovery Protocol Data Unit (LLDPDU) frame according to IEEE 802.1AB standard.

18. The bridge node according to claim 13, wherein the transmitter is adapted to send a plurality of query messages from the same port.

19. The bridge node according to claim 13, wherein the response message is the same as the query message.

20. A layer-2 communications network comprising a bridge node as defined in claim 13.

* * * * *